Figure 1:
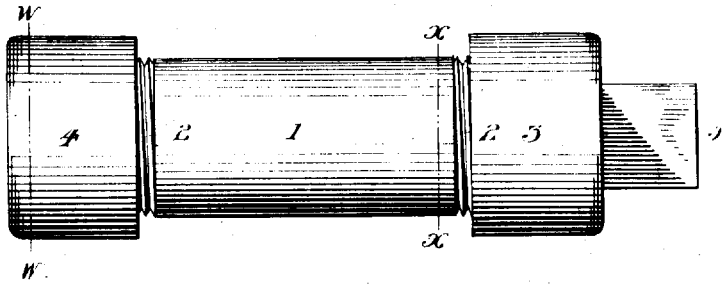

A. F. DAUM.

CARTRIDGE FUSE.

APPLICATION FILED JUNE 23, 1911.

Reissued Nov. 14, 1911. 13,312.

WITNESSES:

F. P. Hoffman,

Samuel Payne

INVENTOR.

A. F. Daum

BY Horace G. Seitz

ATTORNEY.

BEST AVAILABLE COPY

UNITED STATES PATENT OFFICE.

ALBERT F. DAUM, OF PITTSBURGH, PENNSYLVANIA.

CARTRIDGE-FUSE.

13,312. Specification of Reissued Letters Patent. Reissued Nov. 14, 1911.

Original No. 961,716, dated June 14, 1910, Serial No. 547,577. Application for reissue filed June 23, 1911. Serial No. 635,039.

*To all whom it may concern:*

Be it known that I, ALBERT F. DAUM, a citizen of the United States of America, residing at Pittsburgh, in the county of Allegheny and State of Pennsylvania, have invented certain new and useful Improvements in Cartridge-Fuses, of which the following is a specification, reference being had therein to the accompanying drawing.

This invention relates to cartridge fuses, and the objects of my invention are to furnish a fuse cartridge with detachable end caps that can be easily removed to permit of new fuses being placed in the cartridge; and to provide a cartridge fuse that can be easily repaired particularly when the fuse is burned out, without discarding any part of the cartridge fuse.

Other objects of my invention are to provide a cartridge fuse that can be used in connection with a blade contact, binding post or other contacts used in connection with electrical devices, to provide a cartridge fuse with fuses that can be replaced without the use of tools, and to assemble the various parts of the fuse in such a manner that they can be easily and quickly renewed.

Further objects of my invention are to furnish a cartridge fuse with simple and effective means for holding the fuses whereby they can expand and contract without breaking or disarranging any part of the fuse, and to accomplish the above results by a fuse that is simple in construction, durable and inexpensive to manufacture.

These and such other objects as may hereinafter appear are attained by a mechanical construction that will be hereinafter specifically described and then claimed.

Reference will now be had to the drawing forming a part of this specification, wherein:—

Figure 2:
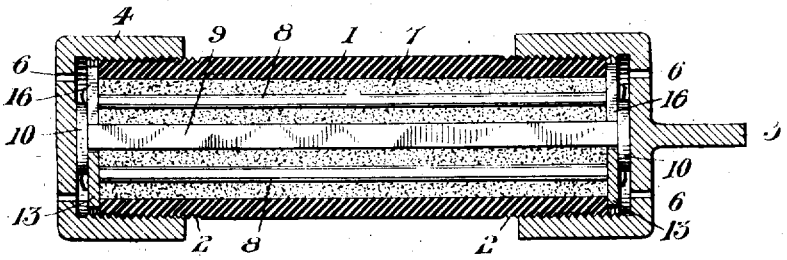
Figure 3:
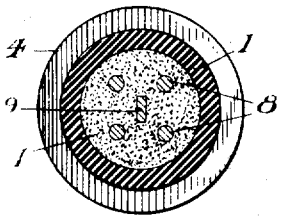
Figure 4:
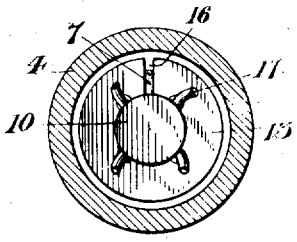
Figure 6:
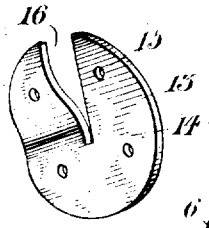
Figure 5:
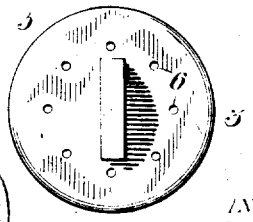
Figure 7:
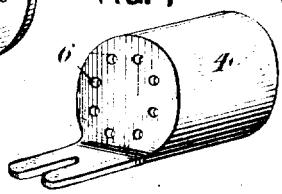

Figure 1 is an elevation of a cartridge fuse constructed in accordance with my invention; Fig. 2 is a longitudinal sectional view of the same; Fig. 3 is a cross-sectional view of the fuse taken on the line X—X of Fig. 1; Fig. 4 is a similar view taken on the line W—W of Fig. 1; Fig. 5 is an end view of the cartridge fuse; Fig. 6 is a perspective view of a detached resilient washer adapted to form part of the fuse; and Fig. 7 is a perspective view of a modified form of fuse cap.

In the accompanying drawing the reference numeral 1 denotes a cylindrical shell or section of tubing made of a suitable non-conducting material and having the ends thereof exteriorly screw-threaded, as at 2, to receive caps 3 and 4, said caps having the walls thereof threaded to screw upon the ends of the shell 1. The cap 3 is provided with a blade 5, whereby the cartridge fuse can be used in connection with a knife switch or a blade contact, and furthermore, the caps are provided with a plurality of circumferentially arranged vents 6 to allow gaseous fumes or other matter to escape from the shell when the fuses are burned out.

In the shell 1 is located a non-combustible and insulation material 7, as soapstone, chalk, asbestos, etc., and extending through the material 7 are a plurality of fuses 8 and 9 made of soft lead or a similar material. These fuses are of a greater length than the shell 1 and the fuse 9 is preferably in the form of a ribbon, and the ends thereof are provided with heads 10 adapted to be soldered or otherwise mounted upon the fuse 9. In some instances, the heads 10 can be formed integral with the ends of the fuses and the heads bent to lock the fuse in position.

Arranged at the ends of the shell 1 and of a greater diameter than the interior diameter of the shell 1 are resilient split washers 13 provided with a slot 14 and openings 15, the slot 14 forming the inner end of the slit 16 of said washer. The washers 13 are made of light and durable metal with the slots 14 centrally thereof and the openings 15 equally disposed around said slots. The edge of the washer bordering upon the slit 16 is bent out of the plane with respect to the opposite edge of the washer, whereby the washer will have a certain resiliency for a purpose that will presently appear. The ends of the fuses 8 are adapted to extend through the openings 15 and be bent against the washers, as at 17, and these fuses are used where the current is of small capacity, and when the current is increased,

BEST AVAILABLE COPY the ribbon fuse 9 is used, this fuse being placed in position by sliding the washers into engagement with the headed ends thereof, the slit 16 of said washers being of a sufficient width to allow the ends of the ribbon to enter the slots 14 of the washers.

The resilient washers 13 are adapted to be held in engagement with the ends of the shell 1 by the caps 3 and 4 engaging the ends of the fuses 8 and 9, and the resiliency of the washers is adapted to normally maintain contact between the ends of the fuses and the cap 4, irrespective of any expansion and contraction upon the parts of said cap.

In Fig. 7 of the drawing, I have illustrated a modified form of cap, the cap having one edge thereof provided with a bifurcated extension 15 which permits of a cartridge fuse equipped with the caps being held between the binding posts or contacts.

Having thus described my invention, what I claim as new is:

1. A rechargeable fuse cartridge comprising a shell of insulating material having its ends exteriorly threaded, metallic end caps adapted to be threaded on said shell, a fuse of greater length than and extending through said shell, and a relatively smooth-edged washer at each end of the shell and having an opening through which the fuse extends, said washers being held in abutting relation to the ends of the shell, the fuse ends overlapping the exposed face of the washers adjacent the openings and having contact with the inner faces of the end caps when the latter are threaded to position on the shell.

2. A rechargeable fuse cartridge comprising a shell of insulating material having its ends exteriorly threaded, metallic end caps adapted to be threaded on said shell, a fuse of greater length than and extending through said shell, and a relatively smooth-edged washer at each end of the shell and having an opening through which the fuse extends, said washers being held in abutting relation to the ends of the shell, the fuse ends overlapping the exposed face of the washers adjacent the openings and having contact with the inner faces of the end caps when the latter are threaded to position, the washers forming the supporting means for the fuse, whereby the fuse may be positioned prior to the placing of the end caps in position on the shell.

3. A rechargeable fuse cartridge comprising a shell of insulating material, metallic end caps having their skirts secured exteriorly of the ends of the shell, a fuse extending through said shell, and a washer within each end cap and free therefrom, said washer having an opening through which the fuse extends, the projecting portions of the fuse being located between the exposed faces of the washers and the inner faces of the end caps when the latter are in position, whereby the fuse may be positioned prior to the placing of the end caps in position on the shell.

4. A rechargeable fuse cartridge comprising a shell of insulating material having its ends exteriorly threaded, end caps adapted to be threaded on said shell, a fuse of greater length than and extending through said shell and a metallic member at each end of the shell and adapted to support the fuse ends, whereby the fuse may be positioned prior to the placing of the end caps in position on the shell, said members and caps being free from threaded engagement, the positioning of said caps providing a close electrical current path between the end caps and fuse.

5. A rechargeable fuse cartridge comprising a shell of non-conductive material, resilient washers fitted against the ends of the shell and provided with openings, a fuse extending through the shell and openings of the washers and bent to engage the exposed faces of the washers, and end caps threaded on the ends of said shell to engage the ends of the fuse, said washers compensating for the expansion and contraction of the fuse and the caps and adapted to normally maintain the ends of the fuse in engagement with the caps.

6. In a cartridge fuse, the combination with a shell of non-conductive material, insulation filling the shell, resilient washers fitted against the ends of said shell and provided with openings, each washer having a radial slit with a portion of each washer bent out of the plane of the remaining portion of the washer, a fuse extending through the insulation material in the shell and having its ends bent to engage the outer sides of the washers, and end caps threaded on the ends of said shell to engage the ends of said fuse, said slitted washers compensating for the expansion and contraction of the fuse and said caps and adapted to normally maintain the ends of the fuse in engagement with the caps.

7. In a cartridge fuse, the combination with a shell of non-conductive material, insulation filling the shell, resilient washers fitted against the ends of said shell and provided with openings, each washer being provided with a radial slit with a portion of each washer bent out of the plane of the remaining portion of the washer, a plurality of fuses extending through the insulation material in the shell, some of said fuses having the ends thereof extending through the openings of said washers and bent to engage the outer sides of the washers, another fuse extending through the filling of said shell, heads carried by the ends of said fuse, and end caps threaded on the

BEST AVAILABLE COPY ends of said shell to engage the ends of said fuses, said slitted washers compensating for the expansion and contraction of the fuses and said caps and adapted to normally maintain the ends of said fuses in engagement with said caps.

In testimony whereof, I have hereunto affixed my signature in the presence of two witnesses.

ALBERT F. DAUM.

Witnesses:
HORACE G. SEITZ,
P. T. THWAITE.